United States Patent [19]

Perecman

[11] Patent Number: 5,589,026

[45] Date of Patent: Dec. 31, 1996

[54] METHOD AND APPARATUS FOR ADHERING OBJECT TO A GLASS SURFACE

[75] Inventor: Jack L. Perecman, Golden Valley, Minn.

[73] Assignee: Minnesota Mining and Manufacturing Company, St. Paul, Minn.

[21] Appl. No.: 460,181

[22] Filed: Jun. 2, 1995

[51] Int. Cl.⁶ .................................................. B32B 31/20
[52] U.S. Cl. .................. 156/286; 156/307.7; 156/321; 156/358; 156/359; 156/382; 156/574; 156/578; 156/583.1; 156/583.3
[58] Field of Search ............................... 156/94, 99, 104, 156/105, 382, 275.5, 286, 306.9, 307.7, 358, 379.8, 380.6, 583.3, 312, 391, 583.1, 321, 359, 574, 578, 579, DIG. 51

[56] References Cited

U.S. PATENT DOCUMENTS

| | | | |
|---|---|---|---|
| 2,987,098 | 6/1961 | Daniel | 156/94 X |
| 3,769,132 | 10/1973 | Cram | 156/286 |
| 3,837,965 | 9/1974 | Mahon et al. | 156/94 X |
| 3,948,719 | 4/1976 | Beckham | 156/556 |
| 4,108,713 | 8/1978 | Weisz | 156/583.3 X |
| 4,554,036 | 11/1985 | Newsom | 156/94 |
| 4,652,319 | 3/1987 | Hammond | 156/382 X |
| 4,820,148 | 4/1989 | Anderson | 156/382 X |
| 5,061,333 | 10/1991 | Ishikawa et al. | 156/382 X |

FOREIGN PATENT DOCUMENTS

| | | |
|---|---|---|
| 0358768 | 3/1990 | European Pat. Off. . |
| 0529806 | 3/1993 | European Pat. Off. . |
| 1914818 | 2/1970 | Germany . |

OTHER PUBLICATIONS

Brochure entitled "Silicone Film Adhesives: Bonding Automotive Fixtures to Glass", Dow Corning Corp., Mar. 1993.
Brochure entitled "Saflex Polyvinyl Butyral Interplayer Laminating Guide", Monsanto Company, date unknown.

*Primary Examiner*—Michael W. Ball
*Assistant Examiner*—Francis J. Lorin
*Attorney, Agent, or Firm*—Gary L. Griswold; Walter N. Kirn; Leland D. Schultz

[57] ABSTRACT

The object is applied to the glass surface by a platen assembly mounted inside the apparatus which resiliently urges the object against the glass surface. In one embodiment, the platen assembly is mounted on a resilient diaphragm within the apparatus and the application of a vacuum causes the diaphragm to move the platen assembly towards the object, thereby causing the platen assembly to urge the object against the glass surface. In a second embodiment, the platen assembly is mounted to the apparatus shell or housing and the apparatus is sealed against the glass surface by a resilient bellows. Upon application of a vacuum, the bellows compresses, thereby causing the platen assembly to urge the object against the glass surface.

17 Claims, 7 Drawing Sheets

5,589,026

METHOD AND APPARATUS FOR ADHERING OBJECT TO A GLASS SURFACE

BACKGROUND OF THE INVENTION

1. Field of the Invention

This invention relates generally to methods and apparatus for adhering objects to glass surfaces, and more particularly to methods and apparatus for adhering mirror buttons to vehicle windshields.

2. Background of the Invention

Numerous approaches have been employed in the past to overcome the difficulties in adhering objects to glass surfaces. For instance, rear view mirrors in vehicles are frequently mounted on the inner surface of a glass windshield. For the purposes of this invention, the term "vehicle" includes any transportation device having a windshield, including, but not limited to, automobiles, motorcycles, trucks, airplanes, boats, or the like. Most conveniently, the rear view mirror is releasably mounted on a "button" (also referred to as a "base" or a "knob") that is permanently mounted directly on the windshield. For convenience, the term "button" will be used herein to include the terms "base" and "knob". Mirror buttons are typically manufactured from sintered stainless steel or cast zinc, or the like.

The button enables the rear view mirror to be removed and remounted on the windshield. Typically, the button is adhered by a layer of adhesive to the windshield. Although many types of adhesives may be employed, it has been found that heat activated adhesives are most effective in bonding the mirror button to the windshield with sufficient strength to permanently mount the mirror button and support the rear view mirror during use. This requires the application of heat and pressure to cure the heat activated adhesive.

Secure adherence of the rear mirror is compounded by the doubly concave curvature of the inner surface of the windshield. Conventional heat activated tapes also have the advantage of being thick enough (for instance, 0.3 m) to provide a sufficiently compliant mount to accommodate the curvature of the windshield. However, it has been observed that air bubbles may be trapped between the adhering layer on the button and the surface of the windshield. These air bubbles may be visible from the exterior of the windshield, and, at a minimum are cosmetically undesirable. While it may be possible to provide an opaque covering to the exterior of the windshield to mask the air bubbles, this adds expense and difficulty (e.g. alignment of the button and the opaque covering, or alternatively, the application of the opaque covering after application of the mirror button) to the mounting of the rear view mirror. The presence of the air bubbles may even significantly reduce the security of the adherence of the button to the windshield.

During initial production of an automobile, a windshield is typically placed in a sealed environment (e.g. an autoclave) and subjected to high levels of pressure and temperature. In addition, most automobile windshields have an inner and outer layer and a polymeric layer interposed between the inner and outer layers. During the exposure to the high pressure and temperatures, this polymeric layer is fused and becomes optically transparent. The fused polymeric layer is a safety layer to control pieces of the windshield after breakage of the windshield. An incidental effect of the autoclave is to simultaneously cure the heat activated adhesive and secure the button to the windshield, as well as to drive out any trapped air bubbles to adhere the button to the windshield. The windshield may be then be assembled into the vehicle with the mirror button.

However, it is sometimes necessary to replace a windshield, or a mirror button, on a vehicle. As previously mentioned, most conventional adhering systems require the application of heat and pressure while curing the adhesive. This may be somewhat inconvenient in locations outside of a manufacturing facility, and it is undesirable to maintain an inventory of windshields with mirror buttons preattached at the manufacturing facility. Preattaching the mirror buttons is made all the more inefficient by the variety of mirror button designs available for different vehicles. It would also be preferable to be able to mount the mirror button with a manually manipulable device on the interior of the windshield while the windshield is mounted in the vehicle, rather than removing the entire windshield to be placed in an autoclave. However, installation of the mirror button with the windshield in place on a vehicle is rendered somewhat more difficult by the normal location of the mirror button, which necessitates installation in a partially inverted position.

Therefore, it is desirable to provide a method and apparatus for quickly and efficiently adhering an object, such as a rear view mirror button, to a glass surface, such a vehicle windshield.

SUMMARY OF THE INVENTION

The present invention provides a method and apparatus for mounting an object to a glass surface, such as a mirror button having a heat activated adhesive to a vehicle windshield. The method includes enclosing the mirror button in a sealed enclosure and reducing the pressure within the enclosure. The reduction of pressure facilitates the escape of air trapped between the heat activated adhesive and the glass surface. The reduction of pressure also induces a portion of the apparatus of the present invention to move into contact with and apply pressure to the button. Means are provided to heat the mirror button while the pressure is applied, in order to cure the adhesive and bond the button to the windshield. Means may also be provided to align the apparatus of the present invention with the object located on the glass surface. Control means may also be provided to automatically control portions or all of the operation of the apparatus of the present invention.

In one, embodiment, the method of the present invention for adhering an object having a heat activated adhesive layer to a glass surface, includes the steps of: (a) positioning the heat activated layer of the object adjacent the glass surface; (b) enclosing the object in a sealed space after step (a); (c) at least partially evacuating the sealed space about the object after step (b) to remove trapped air bubbles between the glass surface and the object; (d) heating the heat activated adhesive to adhere the object to the glass surface; (e) applying a force to the adhesive to facilitate the adherence of the object to the glass surface.

One embodiment of the apparatus of the present invention includes a device for adhering an object having a heat activated layer to a glass surface, comprising: (a) a shell having a cavity and an opening communicating with said cavity and adapted for receipt of the object while the heat activated adhesive layer of the object is located on the glass surface; (b) a seal adapted for sealing about said opening of said shell when placed over the object on the glass surface; (c) a pump for lowering pressure within said cavity when said shell is sealed against the glass surface, adapted to extract trapped air bubbles between the heat activated adhesive layer of the object and the glass surface; (d) a heater located within said cavity adapted for heating the heat activated adhesive layer to a temperature sufficient to adhere the object to the glass surface; and (e) a platen assembly adapted for contact with the object for applying a force to the object with said heat activated adhesive layer being heated to adhere the object to the surface.

BRIEF DESCRIPTION OF THE DRAWING

The present invention will be further explained with reference to the drawing figures referenced below, wherein like structure is referred to by like numerals throughout the several views.

FIG. 4AA is a partial magnified cross sectional view of an alternate embodiment of the diaphragm of the present invention;

DETAILED DESCRIPTION OF THE INVENTION

Figure 1:
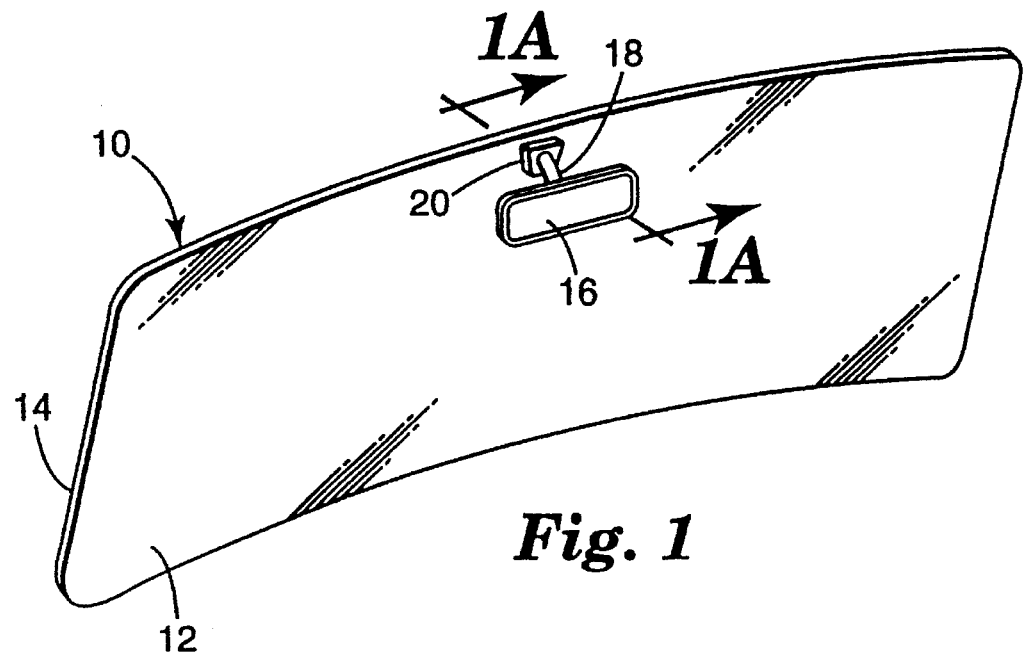
FIG. 1 is a perspective view of a vehicle windshield with a rear view mirror mounted thereon.
Figure 1A:
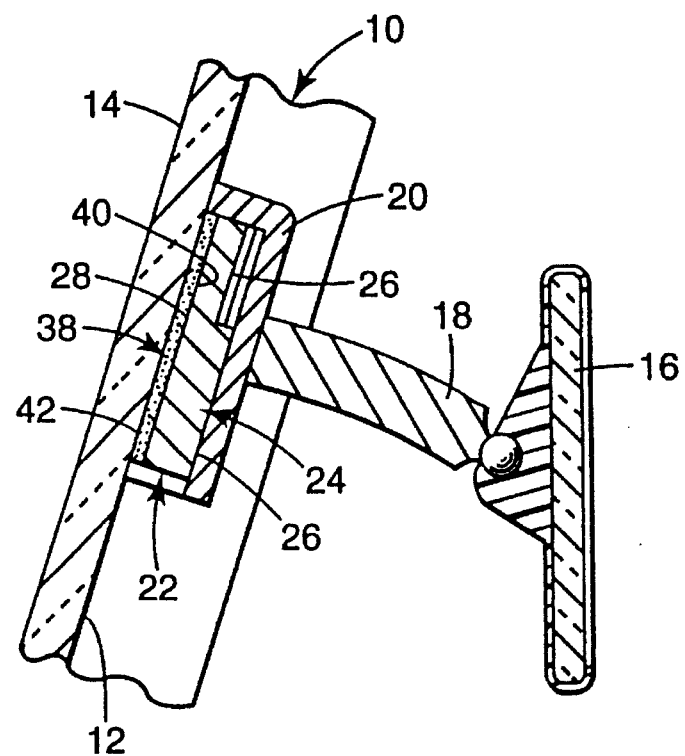
FIG. 1A is a side cross sectional view along plane 1A—1A of the vehicle windshield and rear view mirror of FIG. 1, including a button assembly.

Referring now to FIGS. 1 and 2, there is shown a glass surface 10, which in the illustrated embodiment of the invention, is a vehicle (as defined herein) windshield having an exterior surface 14 and an interior surface 12. Rear view mirror 16 is to suspended from the interior surface 12 of the windshield by stalk 18 and holder (sometimes referred to as a "turtle") 20. Rather than mount the rear view mirror directly on the windshield, button assembly 22 is mounted thereon and is designed to releasably engage, the mirror in a manner known in the art. Of course, it will be recognized that the present invention may be employed to adhere any desired object to a glass surface, such as a vehicle windshield. Such alternate objects may include, but are not limited to decorative labels, speakers, hooks, hinges, and window and door hardware. Rear view mirrors are discussed herein merely for illustrative purposes.

Figure 2A:
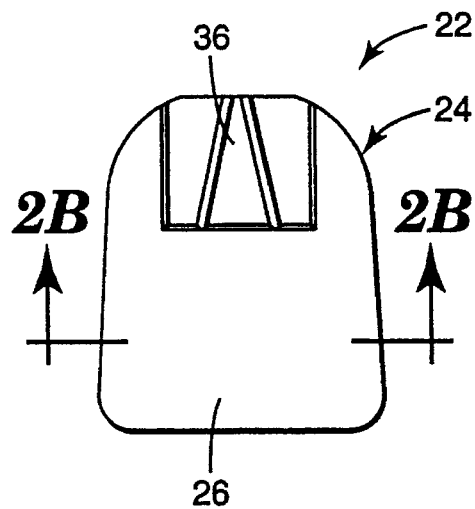
FIG. 2A is a top view of the button assembly of FIG. 1A.
Figure 2B:
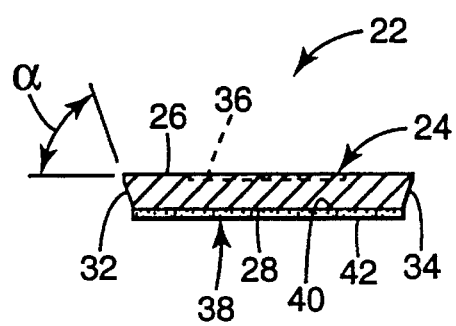
FIG. 2B is a cross sectional view along plane 2B—2B of the button assembly of FIG. 2A.

Button assembly 22 (also shown in FIGS. 2A and 2B) includes button 24 including a top surface 26 and a bottom surface 28 and opposing side edges 32, 34. Each of the side edges 32, 34 are inclined at an angle α with respect to a plane extending through the button generally parallel to the top surface 26 and the bottom surface 28, to engage cooperatively tapered or inclined surfaces (not shown) on the holder 20. Further, an engagement feature 36 is formed in the top surface 26 to engage a cooperative feature (not shown) on the holder 20. The button shown in FIGS. 2A and 2B is merely illustrative and it will be recognized that many different button designs have been developed. The button illustrated is available under the trademark GM #S-3823 from SSI Technology, Inc. of Janesville, Wis. This button is the most widely used button in the North American automotive market. Other commercially available mirror buttons include the following non-exclusive list: S-3756; S-3832; S-3823 and S-2525, all available from SSI Technology, Inc. of Janesville, Wis. The present invention may be adapted for use with any of the button designs available, and is not limited to the that shown and described herein.

Adhesive layer or tape 38 includes opposing surfaces 40 and 42, with surface 40 in adhesive contact with bottom surface 28 of the button. Generally, it has been found that conventional pressure sensitive adhesives do not bond the button to the glass surface with sufficient adhesive strength to support the weight of the rear view mirror during actual use. However, heat activated adhesive tapes have been found to be useful in this application. For the purposes of this invention, the terms "heat activated adhesive" and "heat activated tape" include non-tacky adhesives and tapes that soften and band after heating while remaining thermoplastic and tacky or non-.tacky adhesives and tapes that cure to a thermoset state after heating. The term "tape" also will include the terms "film" and "sheet".

Heat activated adhesives are preferably supplied as a sheet or as an adhesive transfer tape. Useful types of adhesives include, but are not limited to, polyacetals, such as poly(vinylbutyral), epoxies, silicones, acrylics, urethanes, silicone acrylates, urethane acrylates, and epoxy acrylates. Commercially available films include #9214 tape available from Minnesota Mining & Manufacturing Co., silicone film adhesives from Dow Corning, and poly(vinylbutyral) films available under the SAFLEX trade name from Monsanto Company. Preferably, the adhesive is also tacky or pressure-sensitive at room temperature so that the button can be temporarily held in the desired partially inverted position prior to heat bonding. When the adhesive tape is tacky at room temperature, the tape preferably includes a release liner (not shown) to protect the adhesive from dust and other contaminants. In the preferred embodiment of the invention, the heat activated adhesive tape is #9214 tape.

It will be appreciated that in some applications, it is not necessary for the heat activated: adhesive to be tacky at room temperatures. For instance, if the button or other object is to be bonded to the upper side of a horizontal, planar glass sheet, the adhesive layer normally will stay in place during the curing process. Further, the weight of the button itself may apply enough force on the adhesive layer to complete the curing process, without the application of extraneous force.

In order to permanently secure the button 24 to the windshield using the adhesive tape 38, the tape must be heated to a desired temperature, and a sufficient level of pressure is applied, all for a minimum period of time, in order to cure the adhesive. In addition, it is desirable to remove any air bubbles that may be trapped between the adhesive tape 38 and the interior surface of the windshield, as previously explained.

Figure 3:
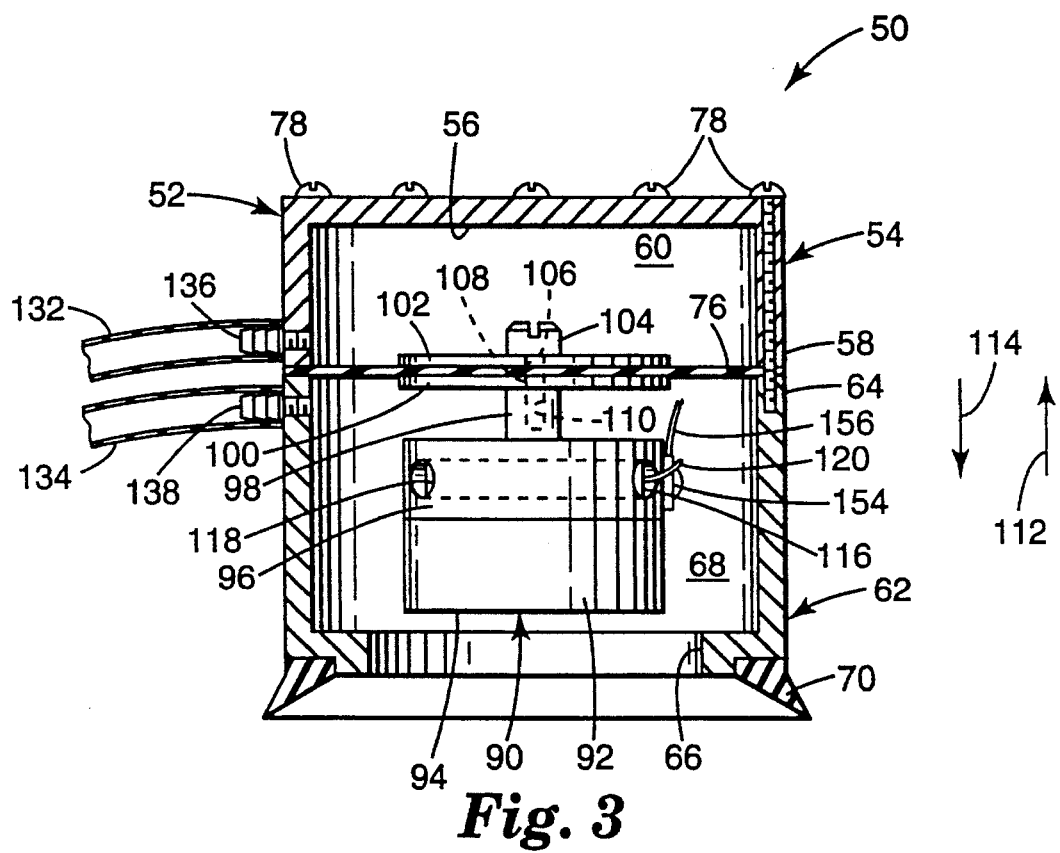
FIG. 3 is a side cross sectional view of a first embodiment of the device of the present invention in a first position.
Figure 4A:
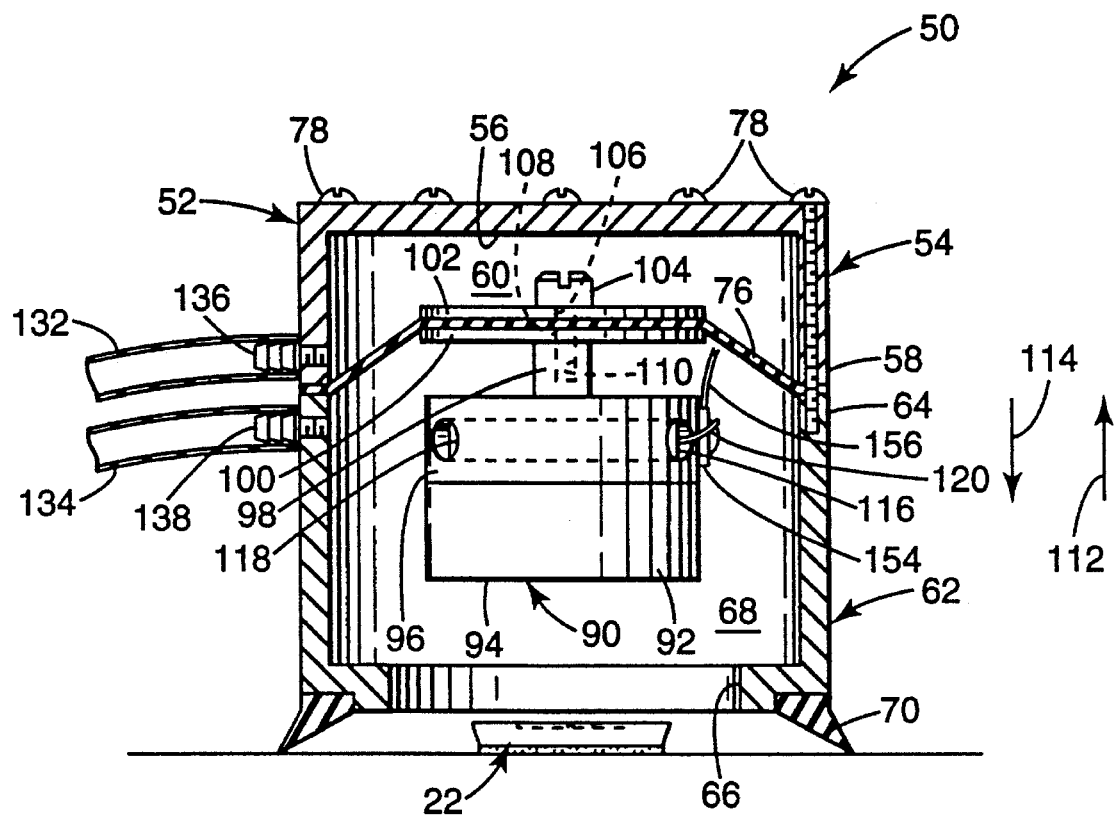
FIG. 4A is a side cross sectional view of the first embodiment of the device of the present invention of FIG. 3 in a second position.
Figure 4A:
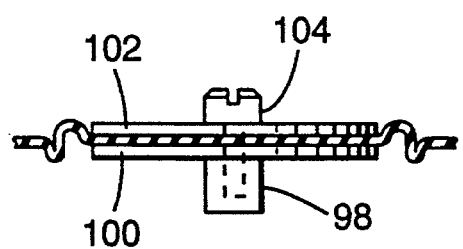
Figure 4B:
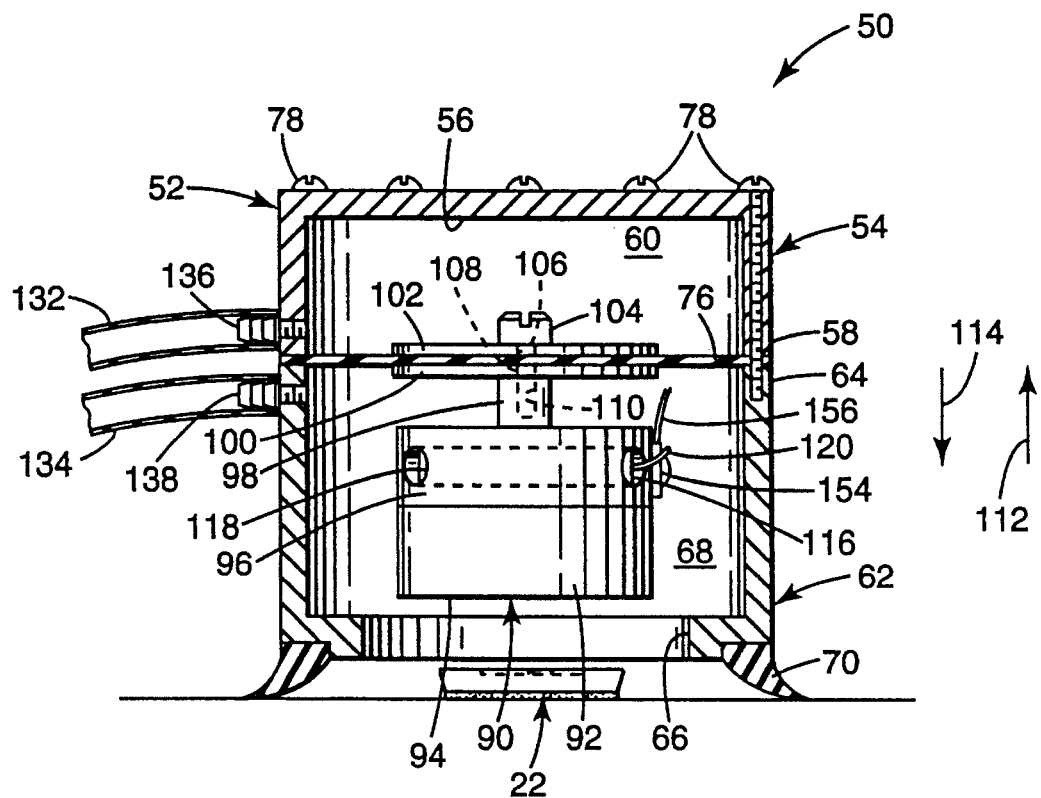
FIG. 4B is a side cross sectional view of the first embodiment of the device of the present invention of FIG. 3 in an alternate second position.
Figure 5:
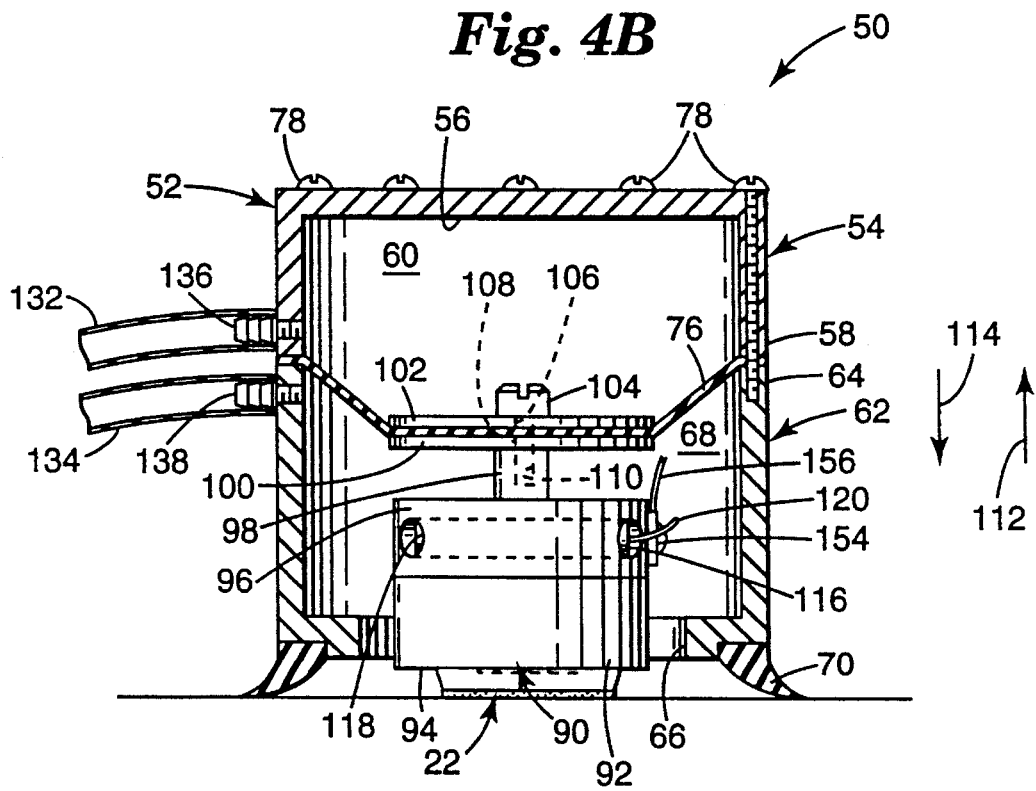
FIG. 5 is a side cross sectional view of a first embodiment of the device of the present invention of FIGS. 3 and 4A, or 4B, in a third position.

One embodiment 50 of the device of the present invention is shown in FIGS. 3–5. Device 50 includes a shell 52 that includes a first shell portion 54 having a closed end 56 and an open end 58 communicating with a cavity 60 in the first shell portion. A cooperative second shell portion 62 includes a first open end 64 and a second open end 66 and a cavity 68 communicating with both the first and second open ends of the second shell portion.

The shell, and the first and second shell portions may be constructed of any material possessing sufficient strength to withstand the fluctuations in internal pressures and temperatures as will be explained herein later, but which minimizes the weight of the device to facilitate manual manipulation thereof. For instance, the shell may be constructed of a metallic material, such as aluminum to minimize weight. The first and second shell portions may be formed in any suitable manner, for instance, by spinning, machining or extrusion. Alternatively, the shell may be formed from molded or machined polymeric materials, such as may be selected from the following non-exclusive list: nylon, styrene, acrylonitrilebutadienestyrene (ABS), acetal (e.g. Delrin™ available from E.I. DuPont Demours Inc.).

Means are provided to seal the device 50 to the glass surface 12. In the illustrated embodiment, the sealing means includes annular lip seal 70 mounted about second open end 66 of the second shell portion and is downwardly depending and outwardly flaring. The following is a non-exclusive list of materials that may be employed to construct the lip seal 70: neoprene, polyurethane, ethylene propylene diene monomer rubber (EPDM), silicone rubber and natural rubber.

Diaphragm 76 is constructed of a resilient fluid tight material. The following is a non-exclusive list of the materials that may be used to construct the diaphragm: ethylene propylene diene monomer rubber (EPDM) rubber, neoprene, polyurethane, silicone rubber and natural rubber. The diaphragm 76 is interposed between the open end 58 of the first shell portion 54 and the first open end 64 of the second shell portion 62, respectively to seal between cavities 60 and 68. Suitable means are provided to secure the first and second shell portions together, as shown in FIGS. 3–5, so that the diaphragm 76 seals and separates the cavities 60 and 68 within the shell 52. For instance, a plurality of radially spaced, axially extending bolts 78 may extend in a concentric ring through apertures (not shown) the length of the first shell portion, through aligned holes adjacent the perimeter of the diaphragm and engage cooperative aligned threaded holes in the second shell portion about the first open end thereof.

Means are provided to apply heat and pressure to the adhesive layer to cure the adhesive, although it is not necessary to apply the heat and pressure at the same time to complete the curing. In the illustrated embodiment, the heat and pressure means includes platen assembly 90. The platen assembly includes platen 92 having contact surface 94. The platen 92 is mounted on platen support member (also referred to as a heater core) 96 by any suitable means, such as bolts (not shown)). The contact surface 94 is preferably conformable to the recesses and protuberances of the button to which it is to be applied to ensure intimate contact therebetween and facilitate the transfer of heat from the platen to the button assembly. The platen 92 must therefore have a thickness great enough to conform to the positive and negative surface variations in the top surface of the button. Thus, different platens may be installed on the platen support member to accommodate different button configurations. Alternatively, the platen may be permanently joined to or integrally formed with the platen support member 96, and the device dedicated for use with a specific button design.

Mounting member 98 is connected to platen support member 96. A pair of aligned mounting discs 100 and 102 are located on each side of the diaphragm 76. The platen 92 may be secured to the diaphragm 76 such as by bolt 104 that extends through aligned openings 106 and 108 in the mounting discs 100 and 102 and engages a cooperative threaded hole 110 in mounting member 98. The opposite end of the mounting member 98 may include a threaded stem 111 that engages a cooperative threaded hole in the mounting disc. In the arrangement shown, the platen assembly may be axially moved in opposing directions 112 and 114, resiliently supported by the diaphragm 76.

The adhesive layer may tie heated by any process of conduction, convection or radiation of thermal energy, or any combination thereof. The heating means in the illustrated embodiment includes means to heat the platen so that the heat from the platen may be transferred (conducted) through the contact surface 94 when the platen is brought into contact with the button 22, and thus transferred by conduction through the button to the adhesive layer. At least one heater cartridge 116 is provided in thermal contact with the platen, and preferably the heater cartridge is inserted into passageway 118 of the platen support member 96. The heater cartridge is preferably electrically connected by lead 120 to a source of electrical power (not shown, but preferably exteriorly of the shell 52) to generate heat. Although only one heater cartridge is shown, two or more heater cartridges may be employed and may be preferable in that multiple source of heat distribute the heat through the platen support member and to the platen. The platen and platen support member are constructed of thermally conductive materials to facilitate the transfer of heat though the platen support member and the platen to the button assembly. One such thermally conductive material is aluminum (such as 6061-T6 grade) that is also relatively light in weight. Gold and silver have excellent heat transfer properties, but are relatively heavy and expensive.

Preferably, the mounting; member 98 is constructed in a manner so as to be thermally insulating, to protect the remainder of the device from the elevated temperature of the platen and platen support member. The following is a non-exclusive list of thermally insulating materials that may used to construct the mounting member: ceramic, asbestos, silicone rubber or glass.

Vacuum pump 130 is provided and is connected by vacuum line 132 through port 136 to cavity 60 of the first shell portion 54 and independently through vacuum line 134 though port 138 to cavity 68 of the second shell portion 62. Push button 158 actuates vacuum valve 144 which independently controls the evacuation of air from the cavities 60 and 68 through the vacuum lines 132, 134, respectively. Regulator 140 and check valve 142 are interposed in the vacuum line 132 between the vacuum pump 130 and the cavity 60 of the first shell portion 54. Vacuum valve 144 is connected to both vacuum lines 132 and 134, and is shiftable between a first, open position, as shown in FIG. 6, disengaged with vacuum line 132 to bleed atmospheric pressure into the cavity 60, and a second, closed position engaged with vacuum line 132.

In one embodiment of the method of the present invention, a button assembly 22 is positioned in a desired location on the windshield, temporarily secured by the room temperature tackiness of the adhesive layer 38. The mounting device 50 is positioned (preferably manually) over the button assembly with the lip seal 70 in contact with the windshield and button assembly presented to cavity 68. The vacuum pump 130 is actuated (such as manually by push-button 158) and the vacuum valve 144 is shifted to the second position so that air is partially evacuated from cavity 60 of the first shell portion through port 136 and line 132. This induces the diaphragm 76 to be deflected and the platen assembly to move away in direction 112 from the button assembly, as shown in FIG. 4A. This may be desirable, particularly when the device is used frequently, to retract the heated platen further form the opening 66 for safety reasons.

Alternatively, the diaphragm may be constructed (e.g. molded) with a cup like portion, so that it assumes the position shown in FIG. 4A when in a relaxed position, without the evacuation of air from the cavity 60. In yet another alternate similar embodiment shown in FIG. 4AA, the diaphragm is molded with an undulating or rolling section connecting it to the shell.

Figure 6:
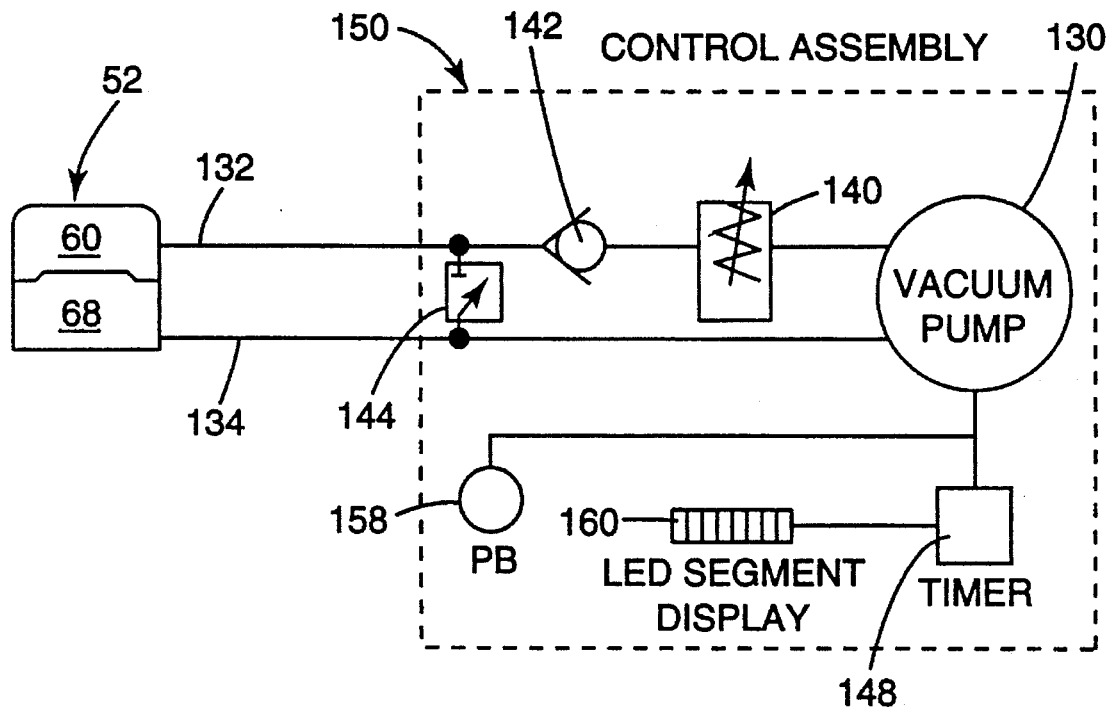
FIG. 6 is a schematic representation of the control assembly of the present invention for the first embodiment shown in FIGS. 3–5.

Next, the vacuum valve is shifted to the open position, shown in FIG. 6, so that air at atmospheric pressure is bled into cavity 60, while cavity 68 remains partially evacuated. This acts to seal the lip seal 70 against the interior surface 12 of the windshield 10. This relative pressure differential between cavity 60 and cavity 68 causes the diaphragm 76 to deflect in direction 114 until contact surface 94 of the platen 92 encounters the top surface 26 of the button 22. The pressure differential is created to urge the platen to apply a force to the button assembly. Also, as previously discussed, the partial vacuum acts to draw out any trapped air bubbles between the adhesive tape 26 and the windshield. It will be understood, however, that it is usually desirable to induce any air bubbles trapped between the adhesive layer 38 and the windshield to escape through partial evacuation of the cavity 68 prior to application of force by the platen on the button. The application of force by the platen may retard or prevent the escape of the air bubbles.

The heater cartridge is activated at an appropriate time either before or after the contact between the platen and the button. The temperature of the platen is elevated so that heat is transferred from the platen through the button to the adhesive tape 38. The adhesive tape is cured to bond the button to the windshield. The heater cartridge and the vacuum pump are actuated for selected (but not necessarily the same) periods of time, until effective bonding of the button assembly to the windshield is achieved. The vacuum pump may be then turned off, the vacuum valve closed. If atmospheric pressure is then introduced to the cavity 68 within the first shell portion, the: device may be easily removed from the windshield. The heater cartridge may be turned off either before or after the removal of the device from the windshield.

Yet another alternate embodiment of the method of the present invention is illustrated in FIG. 4B, wherein vacuum pump evacuates cavities 60 and 68 equally, so that the diaphragm remains stationary, but the lip seal 70 is secured to the windshield as shown. The pressure reaction of the cavity 60 may be decreased (through the vacuum valve) to induce movement of the platen in direction 114, to contact the button assembly and function as hereinelsewhere described.

Although the operation of the heater cartridge and the vacuum pump may be manually controlled, in the preferred embodiment of the invention, a control assembly 150 (shown is provided to automatically regulating, timing, duration, and level. The control assembly includes timer 148 which controls the timing and duration of the heater cartridge 116 and the vacuum pump 130 and vacuum valve 144 and the electric power is controlled by temperature controller 152. A temperature sensing device 154, such as a thermocouple, is mounted on the platen support member and is also in thermal contact with the platen and is connected by leads 156 to temperature controller 152, enabling the electrical power to the heater cartridge, and consequently the temperature of the heater cartridge, be adjusted to achieve a desired temperature in the platen. Push-button 158 also controls the actuation and deactuation of the vacuum pump 96. Push-button 158 may be provided to actuate a preprogrammed sequence from the timer, with LED unit 160 providing a visual indication of the elapsed (or remaining) time of the present invention. It is important that when the device is used in an inverted position, as in conjunction with a windshield, that the vacuum pump not be automatically turned off at the end of the curing process. Otherwise, the device would fall from the windshield. Manual intervention. (e.g. pushing push-button 158 to deactivate the vacuum pump) should be required. The control assembly is preferably separate from the shell and platen assembly, to minimize the weight that must be manipulated or supported from the windshield. The control assembly is flexibly connected to the shell and platen assembly by the electrical leads and the vacuum lines.

Figure 7:
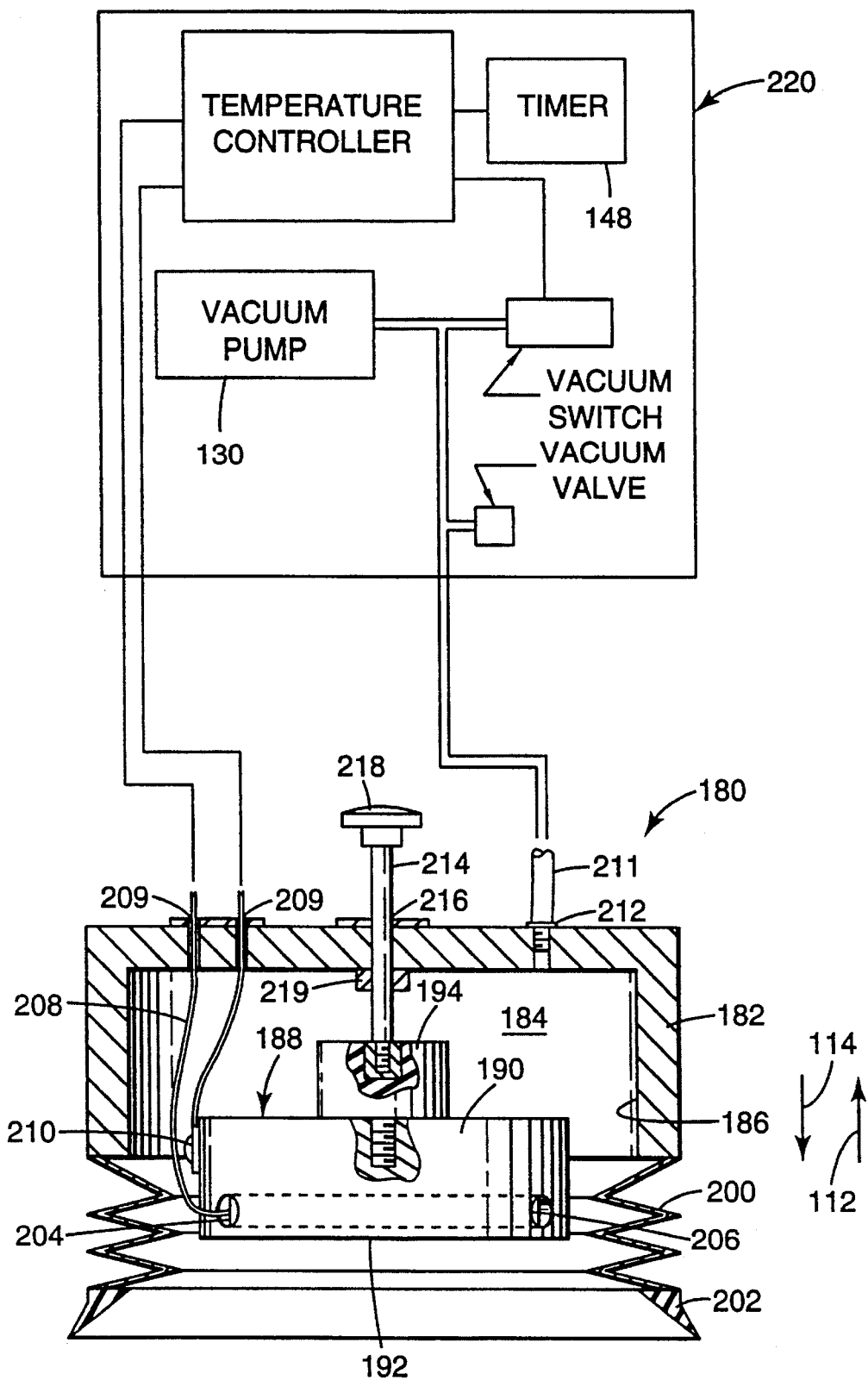
FIG. 7 is a side cross sectional view of a second embodiment of the device of the present: invention in a first position with a schematic representation of a control assembly.
Figure 8:
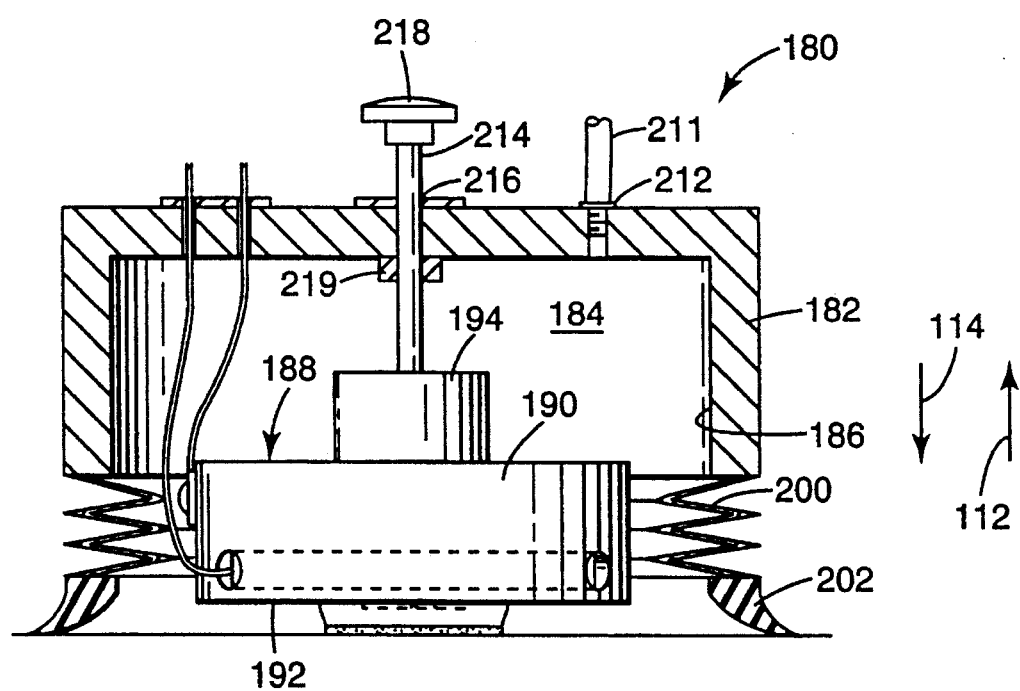
FIG. 8 is a side cross sectional view of the second embodiment of the device of the present invention of FIG. 7 in a second position.

FIGS. 7 and 8 illustrate and alternate embodiment 180 of the present invention in which a unitary shell 182 is provided having a cavity 184 therewithin and an opening 186 communicating with the cavity. A platen assembly 188 includes a platen 190 having a contact surface 192 is mounted within the cavity 184 and secured to mounting member 194, that is preferably a thermal insulator, such as in the manner described with respect to FIGS. 3–5. In this embodiment, a platen that is designed for use with a particular button is shown, but it will be appreciated that a platen support member and interchangeable platens may be employed, as in the embodiment shown in FIGS. 3–5. Bellows 200 is mounted about the open end 186 of the shell 182 by any suitable means, but conveniently may be secured and sealed to the shell by a pressure sensitive adhesive tape. One commercially available tape that may be employed to secure the bellows to the shell is 3M brand electrical tape available from the Minnesota Mining and Manufacturing Company of St. Paul, Minn. The bellows is biased to a relaxed position which spaces the platen 190 from the button when the device 180 is located over a button assembly 20. The bellows 200 may be constructed of a metallic material or a resilient polymeric material (which may need to be reinforced to withstand the fluctuations in pressure experienced during use). Seal 202, similar to lip seal 70) is provided at the distal end of the bellows 200 to securely seal against the windshield.

As in the embodiment illustrated in FIGS. 3–5, one or more heater cartridges 204 are mounted in one or more passageways 206 of the platen and connected by lead(s) 208 through apertures 209 in the shell to exterior electrical power source. A temperature sensing device 210, such as a thermocouple, is also in thermal contact with the platen and enables the electrical power to be adjusted to achieve a desired temperature in the platen. A vacuum pump 130 is provided and is connected by a single vacuum line 211 through port 212 to the cavity 184. The embodiment 180 further includes a control assembly 220 that is similar in purpose to control assembly 130, except that only one Vacuum line is required.

In operation, a button assembly is positioned in a desired location on the windshield, as previously discussed with respect to the embodiment shown in FIGS. 3–5. The mounting device 180 is positioned (preferably manually) over the button assembly with the seal 202 in contact with the windshield. The vacuum pump is actuated and the vacuum switch is set to control the vacuum pump so that air is partially evacuated from the shell and a desired level of pressure is maintained in the cavity 184. This reduction in pressure within the cavity acts to seal the bellows against the windshield. Also, as previously discussed, the partial vacuum acts to draw out any trapped air bubbles between the adhesive tape 38 and the windshield. The partial vacuum created in the cavity 184 of the shell 182 causes the bellows to deflect in direction 114, so that the shell, thermal insulator and platen move as a unit in the same direction until contact surface 192 of the platen 190 encounters the top surface 26 of the button. The heater cartridge is activated and the temperature of the platen is elevated so that heat is transferred from the paten through the button to the adhesive tape. The adhesive tape is cured to bond the button assembly to the windshield. The heater cartridge and the vacuum pump are actuated for selected (but not necessarily the same) periods of time, until effective bonding of the button assembly to the windshield is achieved. The vacuum pump may be then turned off, the vacuum switch is opened. If atmospheric pressure is then introduced to the cavity within the shell through the vacuum valve, the bellows relaxes against the windshield, and the shell and platen move as a unit in direction 114. Device 180 may then be removed from the windshield. The heater cartridge may be turned off either before or after the removal of the device from the windshield.

In the embodiment shown in FIGS. 7 and 8, means may be provided to enable the platen to be extended independently of the shell 182 in direction 114 towards (or even through) opening 186 or bellows 200. Preferably, the platen is extended in direction 114 to a point that visually facilitates the alignment of the platen and the button while manually applying the device to the windshield. Once the device is visually aligned, the remainder of the operation of the device is as herein described.

This may, for instance, be accomplished by mounting the platen and mounting member on shaft 214 that extends through aperture 216 in the shell and terminates in knob 218. The knob may be grasped and pushed in direction 114 to manipulate the platen as described above. Annular flange 219 is provided to contact the shell as the shell moves in direction 114 when the cavity 184 is partially evacuated. The shell and platen assembly thereafter move as a unit in direction 114 towards contact with the button assembly.

Figure 9:
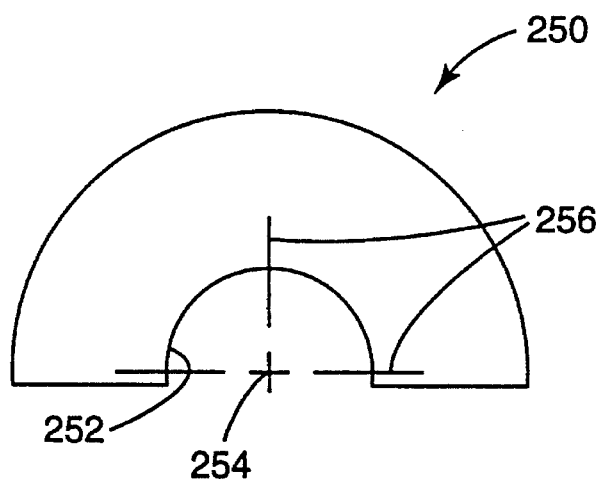
FIG. 9 is plan view of a locating member for use with the apparatus of the present invention.

Another arrangement for properly aligning the device with respect to the button is shown in FIG. 9, and includes locating member 250 having a locating portion 252 of its perimeter that conforms to at least a portion of the exterior profile of the device 50 or 180. The locating member may be positioned on the glass surface about the button assembly. The locating member may be releasably secured to the glass windshield, such as by Post-it™ brand repositionable adhesive available from the Minnesota Mining and Manufacturing Company of St. Paul, Minn., or by selection of a material that temporarily bonds the locating member to the windshield. In the illustrated embodiment, the locating member includes a semi-circular portion 252 that is centered about point 254 and is sized to receive the seals 70 or 202. Indicia 256 may be provided to facilitate the alignment of the location member. After the device has been secured to the glass surface by activation of the vacuum pump, the locating member may be removed.

Figure 7A:
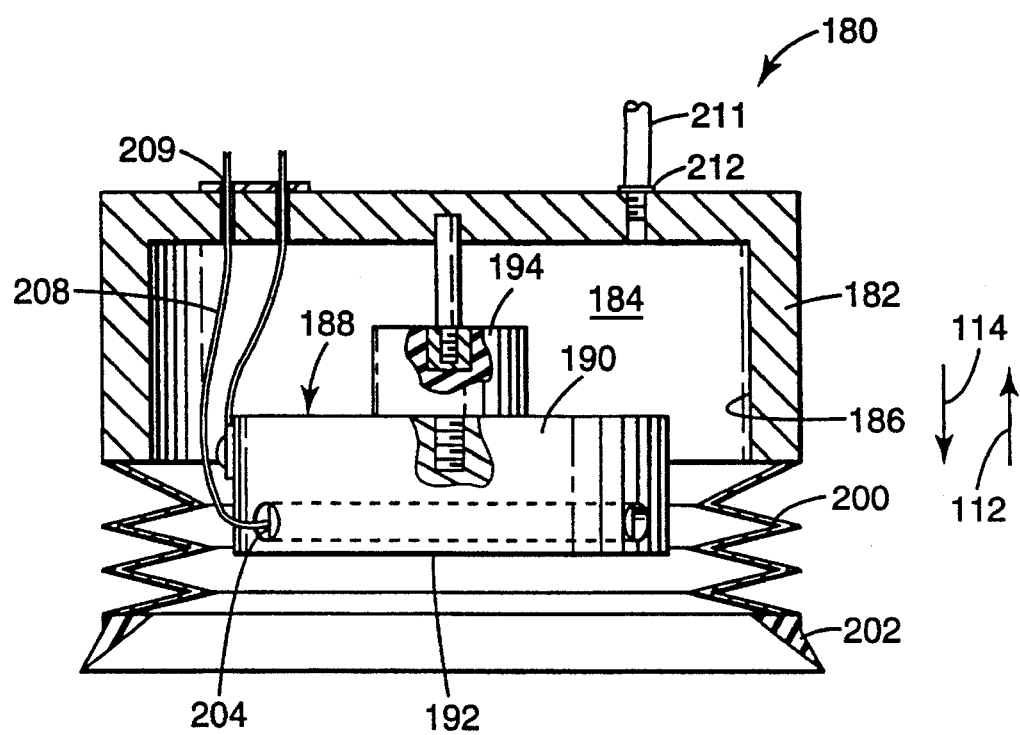
FIG. 7A is a side cross sectional view of an alternate second embodiment of the device of the present invention in a first position, with the platen assembly mounted on the shell of the device.

FIG. 7A shows a variation of the device of FIGS. 7 and 8 in which the platen assembly is rigidly mounted to the shell so that the shell and platen assembly move as a unit at all times. Thus, in the embodiment of the present invention shown in FIGS. 3–5, the shell remains stationary with respect to the windshield (with the possible exception of relatively slight deflection of the lip seal as the pressure is reduced in the cavity 68), and the platen assembly moves independently of the shell towards and away from the button assembly; whereas in the embodiment of the present invention shown in FIGS. 7A, the platen assembly and the shell move as a unit towards and away from the windshield.

The present invention thus provides a method and apparatus that may be use to quickly and easily mount the button assembly to a windshield, even if already mounted in art automobile. It is one of the advantages of the preferred embodiments of the present invention described herein that the device utilizes the partial vacuum created within the second shell portion to simultaneously: 1) seal the shell on the glass surface about the object to be adhered; 2) urge the platen into contact with the object to transfer heat to the adhesive layer of the object; 3) urge the platen into contact with the object to a apply a force to the object while heat activated adhesive is activated; and 4) extract trapped air particles trapped between the adhesive layer and the glass surface. The entire device may be constructed of materials that enable the device to be easily and quickly manually lifted and manipulated into position, making the mounting of objects., such as mirror buttons, convenient and accurately mounted, even on compound curved surfaces, such as automobile windshield, and even if the windshield is installed in an automobile. Removal of the windshield, or pre-mounting of the mirror button on a windshield, is not required. Pre-mounting of the mirror button is undesirable in that it requires an inventory of the windshields to be maintained for each of the various types and sizes of the mirror buttons. Further, it is sometimes desirable that the exact location of the object to be mounted on the glass surface be customized or adjusted for a particular application.

However, it will be appreciated that arrangements other than the platen assembly may be employed to apply heat and pressure to the heat activated layer. As previously mentioned, heat may be transferred to the adhesive layer by radiation or convection. The platen may be urge to apply a force to the button assembly such as through a solenoid or air cylinder, without relying on the partial vacuum created within the cavity of the device.

The following are several examples of devices constructed and utilized according to the present invention:

In a specific embodiment of the invention, a mirror button (GM #S-3823 available from SSI Technology was laminated to an adhesive tape (#9214 tape available from Minnesota Mining & Manufacturing Co.) to form an assembly. The tape had been die-cut to the dimensions of the bottom surface 28 of mirror button 24. The liner was then removed from the assembly and the adhesive side of the assembly was placed in the desired position on a windshield.

A device of the embodiment of FIGS. 7 and 8 was constructed having a unitary cylindrical shell 182 molded from an acetal resin (Delrin™ resin available from DuPont Company) mounted on metal bellows 200 (Model 62070-1 available from Senior Flexionics, Sharon, Mass.). The shell was attached to the bellows by wrapping the circumference of the seam between the shell and the bellows with 1.9 cm wide black electrical tape (3M Brand Electrical Tape available from Minnesota Mining & Manufacturing Co.). The platen 190 was attached to the shell 182 by a conformable mounting member 194 obtained from Tech Products Corp., Dayton, Ohio). The mounting member included a cast hard silicone rubber cylindrical plug measuring approximately 1.25 cm in diameter and 1.9 cm in length, a threaded metal rod protruding from one end of the mount, and a threaded metal insert on the opposite end of the plug. The threaded metal rod extended through a centrally located opening in the top of the shell. Stops were attached near the opening on the inside surface which limited the amount of movement of the platen. The threaded insert was mounted to a bolt protruding from the platen. The platen was equipped with two 70 watt, 120 Volt electrical heater cartridges (Model E1E41HR48 available from Watlow Electric Mfg., Co., St. Louis, Mo.) which were inserted into two openings drilled side by side into the side of the platen to provide uniform heating across the platen. A thermocouple (Model 70XFGA048A available from Watlow) was inserted between the two cartridges and approximately in the center of the platen. The thermocouple and heater cartridges were connected to a timer/temperature controller for the heater cartridges (Model 935-A-1CDO-000R available from Watlow) and a vacuum pump (Model VP0125-V1005-D2-0511 available from Medo U.S.A., Wood Dale, Ill.). The vacuum pump was connected to a vacuum switch (Model V-5100-28-FM-B85-15A from Air Logic, Racine, Wis.) which controlled the vacuum pump. The seal 202 was die-cut from a 1.59 mm thick neoprene rubber sheet (available from Minnesota Rubber, Maple Grove, Minn.). The device was wired according to the control assembly shown in FIG. 7. The approximate outside dimensions of the shell and bellows assembly were about 7.62 cm in diameter by 12.7 cm in height. The weight of the device without the controllers and vacuum pump was about 2 pounds (0.9 kg) with the weight of the entire apparatus about 10 pounds (4.5 kg).

In practice, the device was placed over the button assembly with the platen centered over the assembly. The vacuum pump was turned on, which provided a gauge vacuum pressure of about 15 inches of mercury (50.65 kiloPascals (kPa)). This vacuum was sufficient to hold the device on the windshield, force the platen against the assembly, and to remove air bubbles trapped between the tape and the windshield from the chamber. At the same time, the timer/controller was turned on with a temperature setting of 177 C. and a cycle time of 20 minutes. It was estimated that the time needed for the thermocouple in the platen to reach 177 C. was between about 1 and 2 minutes. After 3 minutes, the timer actuated the switch on the vacuum pump so that the vacuum pump was cycled on and off. The cycling of the vacuum pump reduced the vacuum pressure to about 6 inches of mercury (20.3 kPa), and also reduced the force that the platen exerted on the assembly. The last step helps to prevent the adhesive, softened from the heat, from extruding out from under the button. After 17 more minutes, the process was completed and the timer and heater were turned off. The vacuum was then released and the device was removed. During the bonding of the assembly to the windshield, the adhesive tape turned from a black color to a gray color, indicating that the adhesive was cured and the button was firmly bonded to the windshield.

In another embodiment, a device was constructed according to FIGS. 3–5. First and second shell portions 54 and 62 were made from machined aluminum. The first and second shell portions, which formed cavities 60 and 68, respectively, were attached to each other with threaded bolts. Diaphragm 76, die-cut from a 1.59 mm thick neoprene rubber sheet (available from Minnesota Rubber, Maple Grove, Minn.) to a circular diameter of about 7.6 cm was positioned between the adjoining shell portions and also secured by the threaded bolts. The open end of the second shell was fitted with lip seal 70 which was constructed from cast urethane rubber (80 Shore A durometer urethane rubber obtained from Forsch Polymer Corp., Denver, Colo.). Mounting member 98, molded from silicone rubber and obtained from where Tech Products Corp., Dayton, Ohio, was attached to the diaphragm width a threaded bolt 104 and aluminum mounting disks 100 and 120 on each side of the diaphragm. Mounting member 98 was attached to heater core 96, with a threaded bolt. The heater core held two electric heater cartridges (Model 935-A-1CDO-000R) mounted side by side into the side of the heater core with a thermocouple mounted in the center of the core between the two heater cartridges. An aluminum platen, approximately 1.27 cm thick and about 3.8 cm in diameter was bolted to the heater core. The device was wired according to the schematic of FIG. 6. The, approximate dimensions of the device was 7.62 cm in diameter by 12.7 cm in height.

In practice, the device was positioned over the above-described button assembly on a glass plate with the platen centered over the assembly. Push button 158 (PB) was pressed to start the process cycle which was 20 minutes long. Air was evacuated from cavities 60 and 68 to effect a partial vacuum of about 20 inches of mercury (65.5 kPa) in each cavity. Simultaneously, timer 148 was turned on and the heater cartridges began to heat the heater core and the platen. The temperature controller was set at a thermocouple temperature of 177 C. After 3 minutes, the timer actuated the vacuum regulator 14 (Model V7028-2 BW/K available from Air Logic, Racine, Wis.); the vacuum check valve 142 (Model V1B02-FW from Mead U.S.A., Chicago, Ill.) was opened to bleed air into cavity 60 which forced the platen/diaphragm assembly down onto the button with a force of about 5 pounds (22.2 Newtons). Approximate pressure in cavity 60 was 15 inches of mercury (50.7 kPa). After another 17 minutes, the cycle was completed and the timer turned off the heater cartridges. Air was bled into both cavities to restore atmospheric pressure and the device was removed. The button was firmly attached to the glass plate and the ,adhesive had changed in color from black to a gray color indicating sufficient curing of the adhesive.

The present invention has now been described with reference to several embodiments thereof. It will be apparent to those skilled in the art that many changes can be made in the embodiments described without departing form the spirit and scope of the present invention. For instance, although the preferred embodiments of the present invention provide a device that is manually manipulable, this is not required. The device may, for instance, be manipulated by a robotic arm which reduces the need to make the device as light in weight as possible. Thus, the scope of the present invention should not be limited to the structures described in this application, but only by the structures described by the language of the claims ands the equivalents of those structures.

What is claimed is:

1. A method for adhering an object having a heat activatable adhesive layer to a glass surface, comprising the steps of:

(a) positioning the heat activatable layer of the object adjacent the glass surface;

(b) enclosing the object in a sealed space after step (a);

(c) at least partially evacuating the sealed space about the object after step (b) to remove trapped air bubbles between the glass surface and the object;

(d) heating the heat activatable adhesive to adhere the object to the glass surface;

(e) applying a force using a platen assembly having a contact surface conforming to the shape of the object to the adhesive layer to facilitate the adherence of the object to the glass surface, whereby the platen assembly is resiliently urged against the object by further evacuating the sealed space.

2. The method of claim 1, wherein step (e) includes the step of applying a force to the object and the adhesive layer by at least partially evacuating the space about the object and adhesive layer.

3. The method of claim 1, including the further step of:

(f) repressurizing the sealed space about the object, enabling the enclosure to be removed from the surface.

4. The method of claim 1, wherein in step (b), the space is sealed by the partial evacuation of the space in step (c).

5. A device for adhering an object having a heat activatable layer to a glass surface, comprising:

(a) a shell having a cavity and an opening communicating with said cavity and adapted for receipt of the object while the heat activatable adhesive layer of the object is located on the glass surface;

(b) a seal including a resilient bellows adapted for sealing about said opening of said shell when placed over the object on the glass surface wherein said bellows is mounted on said shell about said opening and is adapted for sealing contact with the glass surface, and wherein said reduction in pressure is said cavity of said shell compresses said bellows to seal said bellows against the glass surface;

(c) a pump for lowering pressure within said cavity when said shell is sealed against the glass surface, adapted to extract trapped air bubbles between the heat activatable adhesive layer of the object and the glass surface;

(d) a heater located within said cavity adapted for heating the heat activatable adhesive layer to a temperature sufficient to adhere the object to the glass surface; and (e) a platen assembly mounted in said cavity and adapted for contact with the object for applying a force to the object with said heat activatable adhesive layer being heated to adhere the object to the surface wherein said platen assembly is mounted on said shell and wherein the compression of said bellows urges said platen assembly into contact with the object on the glass surface to apply a force to the object.

6. The device of claim 5, wherein said heater is in thermal contact with said platen assembly and wherein said platen assembly conveys heat from said heater to the object to heat the heat activatable adhesive layer.

7. The device of claim 6, wherein said heater is mounted within said platen assembly.

8. The device of claim 5, wherein said platen assembly includes a platen having a contact surface for application to the object adapted to apply a force to the object, said platen being mounted on said shell by a mounting member that thermally insulates said platen from said shell and wherein said heater is mounted within said platen assembly in thermal contact.

9. The device of claim 8, wherein said contact surface is preconstructed to conform closely to recesses and protuberances of the object to facilitate transfer of heat from the platen to the object.

10. The device of claim 5, further including a control assembly for controlling the reduction in pressure, application of force and heat to the object by the device.

11. The device of claim 5, wherein said seal includes a lip seal mounted on said shell about said opening and adapted for sealing contact with the glass surface.

12. A manually manipulated device for securing a mirror button having a button and a heat activatable adhesive tape on one side, to a vehicle windshield, comprising:

(a) a shell having
a first portion having a closed end and an open end communicating with a cavity within said first portion,
a second portion having a first open end and a second open end and a prior cavity extending therebetween;

(b) a resilient diaphragm interposed between said open end of said first shell portion and said first open end of said second shell portion, said diaphragm sealing said cavity of said first shell portion from said cavity of said second shell portion;

(c) a lip seal mounted on said second shell portion about the second opening thereof, to seal against the windshield when the device is placed thereon about the button;

(d) a thermally conductive platen mounted by a thermally insulating mounting member on said diaphragm and extending towards said second open end of said second shell portion, said platen being spaced from the button when the device is placed about the button when the diaphragm is in a relaxed position;

(e) a heater inserted into said platen for transferring heat to the heat activated tape on the button when located on the windshield;

(f) a vacuum pump connected to the cavity within said second shell portion when placed on the windshield about the button for inducing a partial vacuum in said cavity of said second shell portion so that
(i) said diaphragm is induced to move towards said second opening of said second shell portion to bring the platen assembly into contact with the button,
(ii) the platen is induced to apply a force to the button,
(iii) the heater transfers heat through said platen to the button to activate the heat activatable adhesive,
(iv) the lip seal seals to the windshield about said second opening of said second shell opening,
(v) trapped air is removed from between the button and the windshield,
wherein when the vacuum pump is deactuated and the partial vacuum is removed from said cavity of said second shell portion
(v) the lip seal is released from the windshield,
(vi) the diaphragm returns to a relaxed position,
(vii) the platen is removed from contact with the button, enabling the device to be removed from the windshield; and (g) a control assembly for controlling the timing, duration and level of said heater and said vacuum pump to adhere the button to the windshield.

13. The device of claim 12, wherein said lip seal is constructed of a material selected from a group consisting of: from neoprene, polyurethane, ethylene propylene diene monomer rubber (EPDM), silicone rubber and natural rubber.

14. The device of claim 12, wherein said diaphragm is constructed from a material selected from the group consisting of neoprene, polyurethane, ethylene propylene diene monomer rubber (EPDM), silicone rubber and natural rubber.

15. The device of claim 12, wherein said diaphragm is molded with a central cup portion and is mounted between said first and said second shell portion with said cup projecting towards said closed end of said first shell portion.

16. The device of claim 12, wherein said control assembly further includes a temperature sensor in thermal contact with said platen for measuring the temperature of said platen enabling said control assembly to adjust said heater to control the heat transferred to the button.

17. The device of claim 16, wherein said temperature sensor includes a thermocouple in thermal contact with said platen.

* * * * *

UNITED STATES PATENT AND TRADEMARK OFFICE
CERTIFICATE OF CORRECTION

PATENT NO. : 5,589,026
DATED : December 31, 1996
INVENTOR(S) : Jack L. Perecman

It is certified that error appears in the above-identified patent and that said Letters Patent is hereby corrected as shown below:

Col. 3, line 44, after the word "present" delete the ":".

Col. 3, line 67, after the word "engage" delete the ",".

Col. 4, line 27, between the words "limited to" and "that shown", delete the word "the".

Col. 4, line 38 delete "non-.tacky" and insert therefor --non-tacky--.

Col. 4, line 60, after the word "activated" delete ":".

Col. 6, line 24, delete the word "tie" and insert therefor --be--.

Col. 6, line 53, after the word "may" insert therefor --be--.

Col. 8, line 6, delete the word "(shown".

Col. 8, line 58, after the number "70" delete ")" and insert therefor --,--.

Col. 10, line 21, delete the word "use" and insert therefor --used--.

Col. 10, line 36, after the word "objects" delete the ".".

UNITED STATES PATENT AND TRADEMARK OFFICE
CERTIFICATE OF CORRECTION

PATENT NO. : 5,589,026
DATED : December 31, 1996
INVENTOR(S) : Jack L. Perecman

It is certified that error appears in the above-identified patent and that said Letters Patent is hereby corrected as shown below:

Col. 12, line 16, delete the word "width" and insert therefor --with--.

Col. 12, line 48, before the word "adhesive" delete the ",".

Col. 12, line 62, delete the word "ands" and insert therefor --and--.

Col. 14, line 19, delete the word "prior" and insert therefor --second--.

Signed and Sealed this

Twenty-second Day of September, 1998

Attest:

BRUCE LEHMAN

*Attesting Officer*     *Commissioner of Patents and Trademarks*